US012651343B2

(12) United States Patent
Do et al.

(10) Patent No.: US 12,651,343 B2
(45) Date of Patent: Jun. 9, 2026

(54) METHOD AND APPARATUS FOR DETECTING MYCOPLASMA USING 3-D QUANTITATIVE PHASE IMAGE MEASUREMENT

(71) Applicant: Tomocube, Inc., Daejeon (KR)

(72) Inventors: Jaephil Do, Daejeon (KR); Sumin Lee, Daejeon (KR); Hye-Jin Kim, Daejeon (KR)

(73) Assignee: Tomocube, Inc., Daejeon (KR)

( * ) Notice: Subject to any disclaimer, the term of this patent is extended or adjusted under 35 U.S.C. 154(b) by 275 days.

(21) Appl. No.: 18/594,475

(22) Filed: Mar. 4, 2024

(65) Prior Publication Data

US 2024/0331155 A1      Oct. 3, 2024

(30) Foreign Application Priority Data

Mar. 28, 2023    (KR) ........................ 10-2023-0040438

(51) Int. Cl.
*G06T 7/00*       (2017.01)
*G01N 21/64*      (2006.01)
*G06T 15/00*      (2011.01)

(52) U.S. Cl.
CPC ....... *G06T 7/0014* (2013.01); *G01N 21/6428* (2013.01); *G06T 15/00* (2013.01); *G01N 2021/6439* (2013.01); *G06T 2200/04* (2013.01); *G06T 2207/10064* (2013.01); *G06T 2207/20036* (2013.01); *G06T 2207/30024* (2013.01); *G06T 2210/41* (2013.01)

(58) Field of Classification Search
CPC .... G06T 7/0014; G06T 15/00; G01N 21/6428
USPC ......................................................... 382/133
See application file for complete search history.

(56) References Cited

U.S. PATENT DOCUMENTS

| | | | |
|---|---|---|---|
| 9,410,970 B2 * | 8/2016 | Tian ........................ | G01N 33/66 |
| 2017/0067816 A1 * | 3/2017 | Artinger ................ | G01N 15/06 |
| 2020/0154710 A1 * | 5/2020 | Hasan ................ | G01N 21/6428 |
| 2022/0156561 A1 | 5/2022 | Hong | |
| 2023/0152231 A1 * | 5/2023 | Nakagawa ........... | G01N 33/533 250/459.1 |
| 2024/0331155 A1 * | 10/2024 | Do ........................ | G06T 7/0014 |

FOREIGN PATENT DOCUMENTS

KR        20210128505 A      10/2021

OTHER PUBLICATIONS

Alexandrov et al., Real-time quantitative visualization of 3D structural information, Apr. 5, 2012, Optics Express, vol. 20, No. 8, pp. 1-12, (Year: 2012).*

(Continued)

*Primary Examiner* — William D Titcomb
(74) *Attorney, Agent, or Firm* — Hayes Soloway P.C.

(57)        ABSTRACT

Disclosed are a method and apparatus for detecting *mycoplasma* using the measurement of a 3-D quantitative phase image. The method of detecting *mycoplasma* may include generating a three-dimensional (3-D) quantitative phase image of a sample by characterizing the sample by making quantitative a phase shift derived from light that passes through the sample, and determining whether the sample has been infected with *mycoplasma* by analyzing behavioral characteristics of the generated 3-D quantitative phase image.

7 Claims, 11 Drawing Sheets

(56)    References Cited

OTHER PUBLICATIONS

Kim et al., Automated Identification of Bacteria Using Three-Dimensional Holographic Imaging and Convolutional Neural Network, Nov. 8, 2018, IEEE Photonics Conference pp. 1-2, (Year: 2018).*

Kim et al. Correlative three-dimensional fluorescence and refractive index tomography: bridging the gap between molecular specificity and quantitatave bioimaging, Dec. 1, 2017, Optical Society of America, vol. 8, No. 12 (Year: 2017).*

Belashov et al., "Machine Learning Assisted Classification of Cell Lines and Cell States on Quantitative Phase Images," Article, 2021, vol. 10, No. 2587, pp. 1-14, Cells.

Steven A. Haney, "An Introduction to High Content Screening: Imaging Technology, Assay Development, and Data Analysis in Biology and Drug Discovery" Jan. 7, 2015; John Wiley & Sons, Incorporated, pp. 1-350.

Kim Kyoohyun; Correlative Three-Dimensional Fluorescence and Refractive Index Tomography; Bridging the Gap Between Molecular Specificity and Quantitative Bioimaging Biomedical Optics Express, vol. 8, No. 12; Nov. 17, 2017, pp. 5688-5697.

* cited by examiner

400

| Cell Type | Normal | | |
| --- | --- | --- | --- |
| | HT | Hoechst | HT+Hoechst |
| Fibroblast |  | | |

| Cell Type | Mycoplasma contamination | | |
| --- | --- | --- | --- |
| | HT | Hoechst | HT+Hoechst |
| Fibroblast | | | |

Brightfield          Holotomography          Holotomography + Hoechst

Mycoplasma-infected fibroblast

METHOD AND APPARATUS FOR DETECTING MYCOPLASMA USING 3-D QUANTITATIVE PHASE IMAGE MEASUREMENT

CROSS-REFERENCE TO RELATED APPLICATION

This application is based on and claims priority under 35 U.S.C. 119 to Korean Patent Application No. 10-2023-0040438, filed on Mar. 28, 2023, in the Korean intellectual property office, the disclosures of which are herein incorporated by reference in their entireties.

TECHNICAL FIELD

Embodiments relates to a method and apparatus for detecting *mycoplasma* using the measurement of a three-dimensional (3-D) quantitative phase image.

BACKGROUND OF THE DISCLOSURE

In quantitative phase imaging, a sample is characterized by making quantitative a phase shift that is derived from light that passes through the sample.

*Mycoplasma* generally refers to bacteria that belong to a genus of *mycoplasma* of mycoplasmataceae. *Mycoplasma* has various sizes of 2 to 5 μm levels, does not have a cell wall, and has an irregular form. *Mycoplasma* is one of the smallest bacteria that may infect people and animals and has a proliferative capacity in an artificial culture medium. *Mycoplasma* may be contaminated due to an animal-derived raw material, reagent, or manufacturing environment which is used upon cell culture, but is not easily detected with the naked eye due to its small size. *Mycoplasma* includes a variety of subtypes, such as *Mycoplasma genitalium, Mycoplasma hominis, Mycoplasma bovis*, and *Mycoplasma gallisepticum* in *Mycoplasma pneumonia*.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a method and apparatus for detecting *mycoplasma* using the measurement of a 3-D quantitative phase image.

There is provided a method of detecting *mycoplasma* by a computer device comprising at least one processor, including generating, by the at least one processor, a three-dimensional (3-D) quantitative phase image of a sample by characterizing the sample by making quantitative a phase shift derived from light that passes through the sample and determining, by the at least one processor, whether the sample has been infected with *mycoplasma* by analyzing behavioral characteristics of the generated 3-D quantitative phase image.

According to an aspect, the behavioral characteristics may include at least one of a refractive index, size, and sphericity of a cell included in the sample.

According to another aspect, determining whether the sample has been infected with *mycoplasma* may include calculating a distribution for the number of granules of a target cell line included in the sample in the generated 3-D quantitative phase image based on the behavioral characteristics, obtaining a distribution for the number of granules of an uninfected comparative cell line having a type identical with a type of the target cell line, and determining whether the target cell line has been infected with *mycoplasma* by comparing the distribution for the number of granules of the target cell line and the distribution for the number of granules of the comparative cell line.

According to still another aspect, the method of detecting *mycoplasma* may further include constructing, by the at least one processor, a database for the number of granules of the comparative cell line. Obtaining the distribution for the number of granules of the comparative cell line may include calculating a distribution for the number of obtained granules of the comparative cell line by obtaining the number of granules of the comparative cell line from the database.

According to still another aspect, determining whether the target cell line has been infected with *mycoplasma* may include determining that the target cell line has been infected with *mycoplasma* when an average or middle value of the number of granules of the target cell line and an average or middle value of the number of granules of the comparative cell line have a difference of a preset standard deviation or more.

According to still another aspect, the method of detecting *mycoplasma* may further include generating, by the at least one processor, a 3-D fluorescent image of the sample based on a direct stain method. Determining whether the sample has been infected with *mycoplasma* may include determining whether the sample has been infected with *mycoplasma* by further using results of an analysis of an overlapped image of the 3-D quantitative phase image and the 3-D fluorescent image.

There is provided a computer device including at least one processor implemented to execute an instruction readable by the computer device. The at least one processor generates a three-dimensional (3-D) quantitative phase image of a sample by characterizing the sample by making quantitative a phase shift derived from light that passes through the sample, and determines whether the sample has been infected with *mycoplasma* by analyzing behavioral characteristics of the generated 3-D quantitative phase image.

According to embodiments of the present disclosure, there can be provided the method and apparatus for detecting *mycoplasma* using the measurement of a 3-D quantitative phase image.

DESCRIPTION OF THE DRAWINGS

The accompany drawings, which are included as part of the detailed description in order to help understanding of the present disclosure, provide embodiments of the present disclosure and describe the technical characteristics of the present disclosure along with the detailed description.

DETAILED DESCRIPTION

Figure 1:
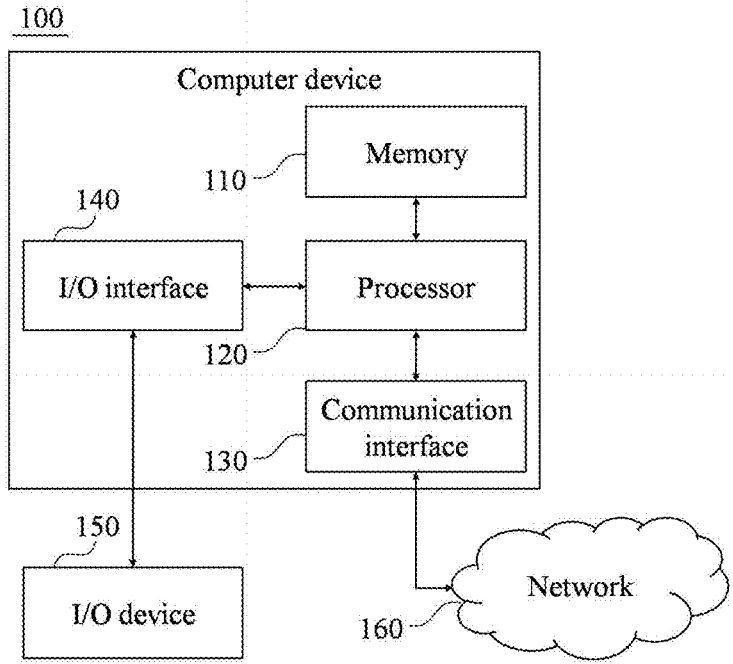
FIG. 1 is a block diagram illustrating an example of a computer device according to an embodiment of the present disclosure.

While illustrative embodiments have been illustrated and described, it will be appreciated that various changes can be made therein without departing from the spirit and scope of the disclosure.

Terms or words used in the specification and claims should not be construed as having common or dictionary meanings, but should be construed as having meanings and concepts that comply with the technical spirit of the present disclosure based on the principle that the inventor may appropriately define the concepts of the terms in order to describe his or her disclosure in the best manner. Accordingly, components described in the embodiments and shown in drawings of the specification are only the most preferred embodiments of the present disclosure and do not fully represent the technical spirit of the present disclosure. Accordingly, it should be understood that a variety of equivalents and modifications capable of substituting the embodiments at the time of filing of this application may be present.

The detection of *mycoplasma* is used in the following various environments.

Biomedical research: *mycoplasma* contamination affects the results of experiments and may degrade the reliability of research data. Accordingly, the detection of *mycoplasma* is very important in guaranteeing the effectiveness of research results.

Production of biomedicines: *mycoplasma* contamination may become a serious problem in the production of biomedicines because *mycoplasma* may affect the safety and efficacy of a final product. Accordingly, a *mycoplasma* negative test is required as part of a production and quality management process for biomedicines.

Clinical diagnosis: *mycoplasma* species cause various diseases of people and animals, and the detection of *mycoplasma* is used to diagnose such infection.

Veterinary science: *mycoplasma* may infect an animal. The infection of livestock may cause a low productivity, a disease, and an economic loss. The detection of *mycoplasma* is used to diagnose and control such infection.

In general, the detection of *mycoplasma* is important in guaranteeing the safety and efficacy of biological products and to protect the health of people and animals.

*Mycoplasma* is a genus of bacteria that are not affected by the existing many antibiotics that are targeted on cell walls because *mycoplasma* does not have a cell wall. The bacteria may cause various diseases of people and animals, and is frequently found in cell culture that is used in research.

A method of detecting *mycoplasma* contamination in cell culture includes the following some methods.

Direct microscope inspection: a *mycoplasma* cell needs to be monitored by using an optical microscope or a fluorescence microscope because the *mycoplasma* cell has a small size. This method requires a special stain procedure, and may not be sensitive as much as other methods.

Enzyme-linked immunosorbent assay (ELISA): this method is used to detect bacteria by using an antibody that is specific to *mycoplasma* protein. When a cell of a sample is dissolved and *mycoplasma* protein is then combined with an antibody, a colorimetric or fluorescent signal appears. Bacteria are determined by detecting the signal.

Polymerase chain reaction (PCR): the PCR is a sensitive method capable of detecting a very small amount of *mycoplasma* DNA in a sample. A PCR primer has been designed to be targeted on a specific area of *mycoplasma* genome. Amplified DNA may be detected by using gel electrophoresis or another method.

Indirect method: the indirect method is a method of detecting a change in cell culture attributable to *mycoplasma* contamination without directly detecting a *mycoplasma* cell or DNA. Such an indirect method also includes detecting a change in the pH or other chemical characteristics of a cell culture medium in addition to a change in a cell form, metabolism, or gene expression.

Each of such methods has advantages and disadvantages. The selection of the method is different depending on specific requirements for a researcher or a laboratory. In order to guarantee the reliability of research results, it is better to regularly test whether *mycoplasma* has been contaminated in cell culture.

Table 1 illustrates sensitivity, advantages, and disadvantages of various methods of detecting *mycoplasma*.

TABLE 1

| METHOD | SENSI-TIVITY | ADVANTAGE | DISADVANTAGE |
|---|---|---|---|
| Direct DNA stain (e.g., Hoechst 33258) | Low | Rapid and cheap | Difficult interpretation |
| Indirect DNA stain (e.g., Hoechst 33258) with indicator cells (e.g., 3T3) | High | Easy interpretation because contamination is amplified | More time is consumed due to indirect method |
| Broth and agar culture | High | Sensitivity high | Slow and interpretation of an expert is required |
| PCR | High | Rapid | Optimization required |
| Nested PCR | High | Rapid | More sensitive than direct PCR, but the possibility of false positive is high |
| ELISA | Normal | Rapid | Detect a limited range of specifies |
| Autoradiography | Normal | Rapid | When a degree of contamination is low, interpretation may be difficult |
| Immunostaining | Normal | Rapid | When a degree of contamination is low, interpretation may be difficult |

In the examples of the detection methods in Table 1, the direct DNA stain method (hereinafter referred to as a "direct stain method") is the fastest and cheapest method, but has a disadvantage in that sensitivity is low.

The direct stain method that uses a Hoechst dye for the detection of *mycoplasma* is a fluorescence microscope-based method, and is a method of monitoring a *mycoplasma* cell through a microscope by dyeing the *mycoplasma* with a fluorescent dye. This method may be performed fast and easily, but has some disadvantages as follows.

Low sensitivity: it may be difficult to distinguish between a *mycoplasma* cell and a host cell by using the Hoechst dye because both *mycoplasma* DNA and host cell DNA are stained by the Hoechst dye. For this reason, a false negative error rate is high, and it may be difficult to detect *mycoplasma* contamination having a low level.

Limited peculiarity: the Hoechst dye may have a high false positive error rate because all DNAs of a sample are stained, results in a nonspecific stain. Accordingly, confusion may be caused in interpretation, and additional check using a more detailed method may be necessary.

Limited information: the direct stain method provides limited information on *mycoplasma* contamination, such as the number *mycoplasma* cells within a sample and the locations of the *mycoplasma* cells. Accordingly, it may be difficult to take measures for checking and controlling a degree and severity of the contamination.

In general, the direct stain method using the Hoechst dye is a fast and easy method for the detection of *mycoplasma*, but has some limits which may affect a capability that provides detailed information on sensitivity, peculiarity, and contamination. For example, it is difficult to determine whether DNA of *mycoplasma* is DNA of actual *mycoplasma* through the direct stain method due to stain noise (or artifact or nonspecific stain) when a nucleus stain reagent is used representatively. Accordingly, in order to accurately detect and make quantitative *mycoplasma* contamination, it is better to use a more detailed and sensitive method, such as PCR or ELISA. However, PCR or ELISA also has the disadvantages illustrated in Table 1.

A method and system for detecting *mycoplasma* according to embodiments of the present disclosure may detect *mycoplasma* by using a three-dimensional (3-D) quantitative phase image. For example, the method and system for detecting *mycoplasma* according to an embodiment may detect *mycoplasma* by determining whether *mycoplasma* has been infected based on a morphology feature in a 3-D quantitative phase image for a cell line. In this case, the morphology feature may include a refractive index, a size, and sphericity. For example, whether *mycoplasma* has been infected may be determined based on the point that the refractive index of a cell that has been infected with *mycoplasma* is relatively higher than the refractive index of organelle within another cell.

The system for detecting *mycoplasma* according to embodiments of the present disclosure may be implemented by at least one computer device. In this case, a computer program according to an embodiment of the present disclosure may be installed and driven in the computer device. The computer device may perform the method of detecting *mycoplasma* according to embodiments of the present disclosure under the control of the computer program that has been driven. The computer program may be stored in a computer-readable recording medium in order to execute the method of detecting *mycoplasma* in a computer in association with the computer device.

FIG. 1 is a block diagram illustrating an example of a computer device according to an embodiment of the present disclosure. As illustrated in FIG. 1, a computer device 100 may include memory 110, a processor 120, a communication interface 130, and an input/output (I/O) interface 140. The memory 110 is a computer-readable recording medium, and may include permanent mass storage devices, such as random access memory (RAM), read only memory (ROM), and a disk drive. In this case, the permanent mass storage device, such as ROM or a disk drive, may be included in the computer device 100 as a separate permanent storage device that is different from the memory 110. Furthermore, an operating system and at least one program code may be stored in the memory 110. Such software components may be loaded onto the memory 110 from a computer-readable recording medium separated from the memory 110. Such a separate computer-readable recording medium may include computer-readable recording media, such as a floppy drive, a disk, a tape, a DVD/CD-ROM drive, and a memory card. In another embodiment, the software components may be loaded onto the memory 110 through a communication interface 130 not a computer-readable recording medium. For example, the software components may be loaded onto the memory 110 of the computer device 100 based on a computer program that is installed by files that are received over a network 160.

The processor 120 may be configured to process instructions of a computer program by performing basic arithmetic, logic, and input/output (I/O) operations. The instructions may be provided to the processor 120 by the memory 110 or the communication interface 130. For example, the processor 120 may be configured to execute received instructions based on a program code that has been stored in a recording device, such as the memory 110.

The communication interface 130 may provide a function for enabling the computer device 100 to communicate with other devices over the network 160. For example, a request, an instruction, data, or a file that is generated by the processor 120 of the computer device 100 based on a program code that has been stored in a recording device, such as the memory 110, may be transferred to other devices over the network 160 under the control of the communication interface 130. Inversely, a signal, an instruction, data, or a file from another device may be received by the computer device 100 through the communication interface 130 of the computer device 100 over the network 160. A signal, an instruction, a file that is received through the communication interface 130 may be transmitted to the processor 120 or the memory 110. A file that is received through the communication interface 130 may be stored in a storage medium (e.g., the aforementioned permanent storage device) which may be further included in the computer device 100.

The I/O interface 140 may be means for an interface with an I/O device 150. For example, the input device may include a device, such as a microphone, a keyboard, or a mouse. The output device may include a device, such as a display or a speaker. As another example, the I/O interface 140 may be means for an interface with a device in which functions for an input and an output have been integrated into one, such as a touch screen. The I/O device 150, together with the computer device 100, may be configured as a single device.

Furthermore, in other embodiments, the computer device 100 may include components greater or smaller than the components of FIG. 1. However, it is not necessary to clearly illustrate most of conventional components. For example, the computer device 100 may be implemented to include at least some of the I/O devices 150 or may further include other components, such as a transceiver and a database.

Figure 2:
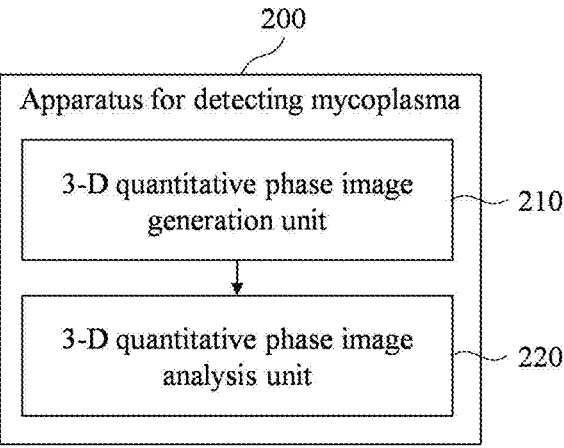
FIG. 2 is a diagram illustrating an example of internal components of an apparatus for detecting *mycoplasma* according to an embodiment of the present disclosure.
Figure 3:
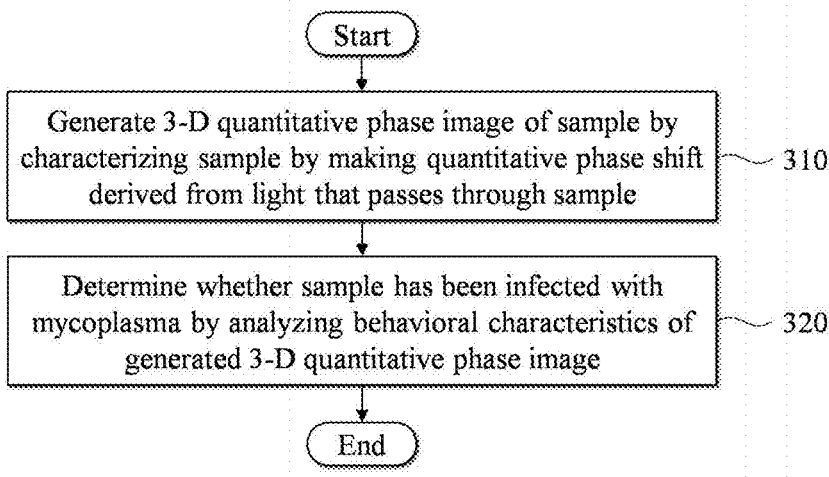
FIG. 3 is a flowchart illustrating an example of a method of detecting *mycoplasma* according to an embodiment of the present disclosure.

FIG. 2 is a diagram illustrating an example of internal components of an apparatus for detecting *mycoplasma* according to an embodiment of the present disclosure. FIG. 3 is a flowchart illustrating an example of a method of detecting *mycoplasma* according to an embodiment of the present disclosure. An apparatus 200 for detecting *mycoplasma* according to the present embodiment may be implemented by the computer device 100, and may include a 3-D quantitative phase image generation unit 210 and a 3-D quantitative phase image analysis unit 220. In this case, the processor 120 of the computer device 100 may be implemented to execute a control instruction according to a code of an operating system or a code of at least one computer program that is included in the memory 110. In this case, the processor 120 may control the computer device 100 so that the computer device 100 perform steps 310 and 320 included in the method of FIG. 3 based on a control instruction that is provided by a code stored in the computer device 100. In this case, the 3-D quantitative phase image generation unit 210 and the 3-D quantitative phase image analysis unit 220 may be functional expressions of the processor 120 of the computer device 100. For example, the 3-D quantitative phase image generation unit 210 may be a logical expression of a function for controlling, by the processor 120, the computer device 100 so that the computer device 100 generates a 3-D quantitative phase image based on a code that has been loaded onto the memory 110.

In step 310, the computer device 100, the apparatus 200 for detecting *mycoplasma*, or the 3-D quantitative phase image generation unit 210 may generate a 3-D quantitative phase image of a sample by characterizing the sample by making quantitative a phase shift derived from light that passes through the sample. For example, the computer device 100 may measure a hologram of light that is emitted from a light source by making the light incident on a cell through using optical diffraction tomography or optical projection tomography and measuring transmitted light that is diffracted from the cell by using an interferometer. In this case, a distribution of 3-D refractive indices of the cell may be measured by using several sheets of two-dimensional (2-D) holograms that are measured while rotating (or scanning) an angle at which the light is incident on the cell. A difference between the optical diffraction tomography and the optical projection tomography lies in whether a recovery algorithm is present by considering whether the diffraction of light in a sample is present. According to an embodiment, the I/O device 150 described with reference to FIG. 1 may further include a photographing device for the optical diffraction tomography or the optical projection tomography. For example, the photographing device includes a light source, and may make light that is emitted from the light source incident on a cell, and may receive transmitted light that is diffracted from the cell. In this case, the diffracted transmitted light may be input to the computer device 100. The computer device 100 may generate a 3-D quantitative phase image by using an interferometer and/or a recovery algorithm. As another embodiment, generating the 3-D quantitative phase image by the computer device 100 may mean that the computer device 100 receives the 3-D quantitative phase image generated by the photographing device by controlling the photographing device.

In step 320, the computer device 100, the apparatus 200 for detecting *mycoplasma*, or the 3-D quantitative phase image analysis unit 220 may determine whether the sample has been infected with *mycoplasma* by analyzing behavioral characteristics of the generated 3-D quantitative phase image. As described above, the behavioral characteristics may include at least one of a refractive index, size, and sphericity of a cell included in the sample. In this case, the computer device 100 may determine whether the sample has been infected with *mycoplasma* by comparing behavioral characteristics of a target cell included in the sample and behavioral characteristics of a comparative cell that has not been infected.

Figure 4:
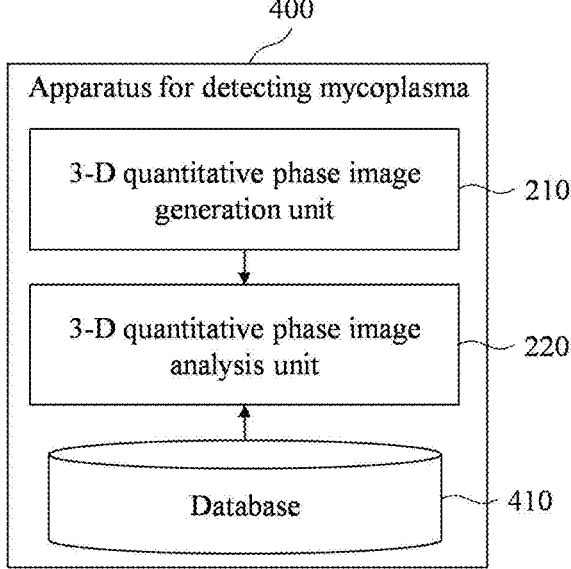
FIG. 4 is a diagram illustrating another example of internal components of an apparatus for detecting *mycoplasma* according to an embodiment of the present disclosure.
Figure 5:
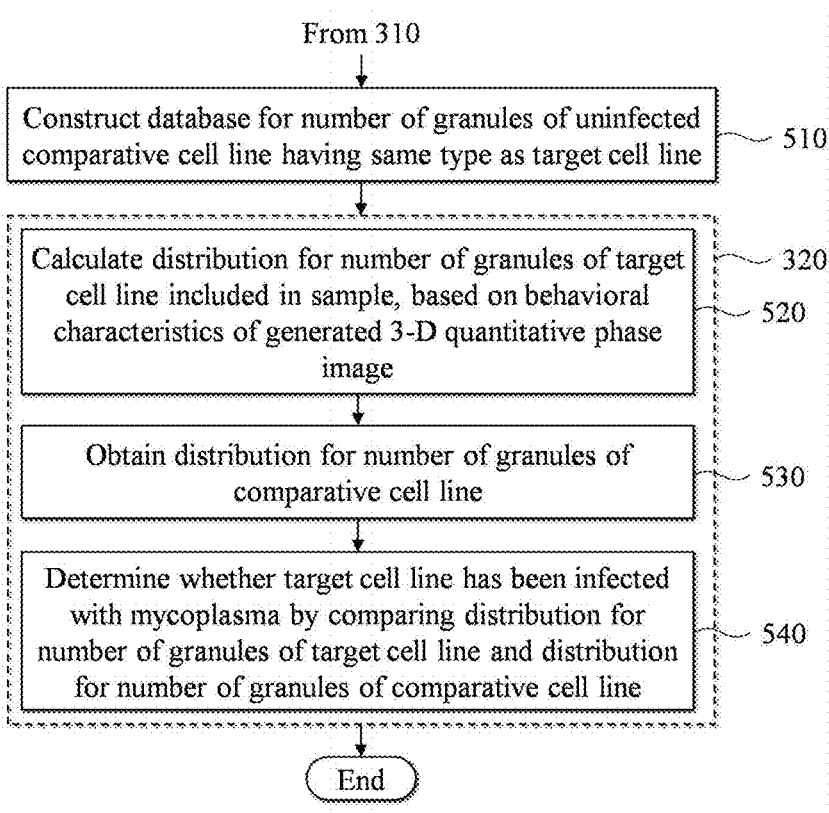
FIG. 5 is a flowchart illustrating an example in which whether a sample has been infected with *mycoplasma* is determined by analyzing behavioral characteristics of a 3-D quantitative phase image in an embodiment of the present disclosure.

FIG. 4 is a diagram illustrating another example of internal components of an apparatus for detecting *mycoplasma* according to an embodiment of the present disclosure. FIG. 5 is a flowchart illustrating an example in which whether a sample has been infected with *mycoplasma* is determined by analyzing behavioral characteristics of a 3-D quantitative phase image in an embodiment of the present disclosure. Step 510 according to the present embodiment may be performed prior to step 320 in FIG. 3. The remaining steps 520 to 540 may be included in step 320 of FIG. 3 and performed.

In step 510, the computer device 100, the apparatus 200 for detecting *mycoplasma*, or the 3-D quantitative phase image analysis unit 220 may construct a database 410 for the number of granules of an uninfected comparative cell line having the same type as a target cell line. The number of granules may be obtained by analyzing behavioral characteristics of the 3-D quantitative phase image. In an example of an apparatus 400 for detecting *mycoplasma* according to an embodiment of FIG. 4, the apparatus 400 further includes the database 410 constructed in step 510, in addition to the 3-D quantitative phase image generation unit 210 and the 3-D quantitative phase image analysis unit 220 which have been described with reference to FIG. 2.

In step 520, the computer device 100, the apparatus 200 for detecting *mycoplasma*, or the 3-D quantitative phase image analysis unit 220 may calculate a distribution for the number of granules of the target cell line that is included in the sample, based on the behavioral characteristics of the generated 3-D quantitative phase image.

In step 530, the computer device 100, the apparatus 200 for detecting *mycoplasma*, or the 3-D quantitative phase image analysis unit 220 may obtain a distribution for the number of granules of the comparative cell line. In this case, the computer device 100 may calculate the distribution for the number of granules by obtaining the number of granules of the comparative cell line from the database 410 constructed in step 510.

In step 540, the computer device 100, the apparatus 200 for detecting *mycoplasma*, or the 3-D quantitative phase image analysis unit 220 may determine whether the target cell line has been infected with *mycoplasma* by comparing the distribution for the number of granules of the target cell line and the distribution for the number of granules of the comparative cell line. The comparison between the distributions may be performed based on various statistical differences. For example, the computer device 100 may determine that the target cell line has been infected with *mycoplasma*, when an average or middle value of the number of granules of the target cell line and an average or middle value of the number of granules of the comparative cell line have a preset standard deviation or more. As a more detailed example, when an average or middle value of the number of granules of the target cell line and an average or middle value of the number of granules of the comparative cell line have a difference of standard deviation (2×SD) or 2.5 SD or more, the computer device 100 may determine that they have a statistically meaningful difference and determine that the target cell line has been infected with *mycoplasma*.

Furthermore, a method and system for detecting *mycoplasma* according to another embodiment of the present disclosure may detect *mycoplasma* with high sensitivity of a normal level or more rapidly and cheaply by simultaneously using a 3-D quantitative phase image and a direct stain method image.

Figure 6:
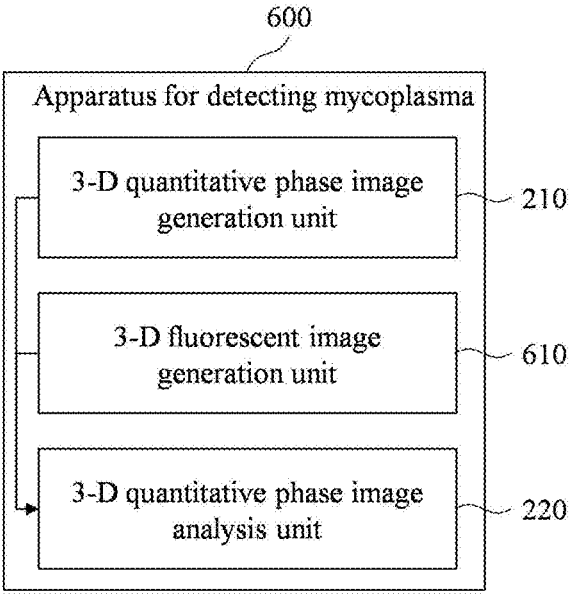
FIG. 6 is a diagram illustrating still another example of internal components of an apparatus for detecting *mycoplasma* according to an embodiment of the present disclosure.
Figure 7:
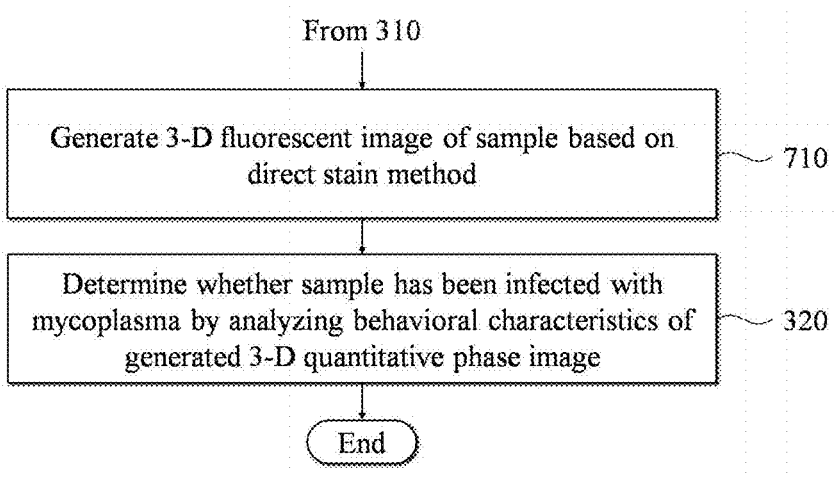
FIG. 7 is a diagram illustrating an example in which *mycoplasma* is detected by simultaneously using a 3-D quantitative phase image and a direct stain method image in an embodiment of the present disclosure.

FIG. 6 is a diagram illustrating still another example of internal components of an apparatus for detecting *myco-plasma* according to an embodiment of the present disclosure. FIG. 7 is a diagram illustrating an example in which *mycoplasma* is detected by simultaneously using a 3-D quantitative phase image and a direct stain method image in an embodiment of the present disclosure. An apparatus 600 for detecting *mycoplasma* according to the present embodiment may further include a 3-D fluorescent image generation unit 610, in addition to the 3-D quantitative phase image generation unit 210 and the 3-D quantitative phase image analysis unit 220 which have been described with reference to FIG. 3. Furthermore, the present embodiment illustrates an example in which step 710 is performed after step 310 and before step 320 in FIG. 3. However, according to an embodiment, step 710 may be performed prior to step 310 in FIG. 3.

In step 710, the computer device 100, the apparatus 200 for detecting *mycoplasma*, or the 3-D fluorescent image generation unit 610 may generate a 3-D fluorescent image of a sample based on the direct stain method. In this case, the computer device 100 may determine whether the sample has been infected with *mycoplasma* by further using the results of the analysis of an overlapped image of the 3-D quantitative phase image and the 3-D fluorescent image, in addition to the behavioral characteristics of the 3-D quantitative phase image in step 320. For example, in the 3-D quantitative phase image, *mycoplasma* may be easily detected because *mycoplasma* has a relatively higher refractive index than other organelle within a cell. However, it is difficult to identify *mycoplasma* in a specific condition, for example, in a bright field image. According, in an embodiment, the detection sensitivity of *mycoplasma* even in a specific condition, such as a bright field image, can be increased by determining whether a sample has been infected with *mycoplasma* by further using the results of the analysis of an overlapped image of a 3-D quantitative phase image and a 3-D fluorescent image. In other words, in a method of detecting *mycoplasma* according to the present embodiment, disadvantages of a direct stain method image and a 3-D quantitative phase image can be mutually supplemented by simultaneously using the direct stain method image and the 3-D quantitative phase image.

FIGS. 8 to 11 are diagrams illustrating examples of images in which a 3-D quantitative phase image, a 3-D fluorescent image, or an overlapped image of the 3-D quantitative phase image and the 3-D fluorescent image in embodiments of the present disclosure.

Figure 8:
FIGS. 8 to 11 are diagrams illustrating examples of images in which a 3-D quantitative phase image, a 3-D fluorescent image, or an overlapped image of the 3-D quantitative phase image and the 3-D fluorescent image in embodiments of the present disclosure.

FIG. 8 illustrates a 3-D quantitative phase image (holotomography (HT)), a 3-D fluorescent image (Hoechst), and an overlap image (HT+Hoechst) of the 3-D quantitative phase image and the 3-D fluorescent image with respect to each of normal fibroblast and fibroblast that has been infected with *mycoplasma*.

Figure 9:
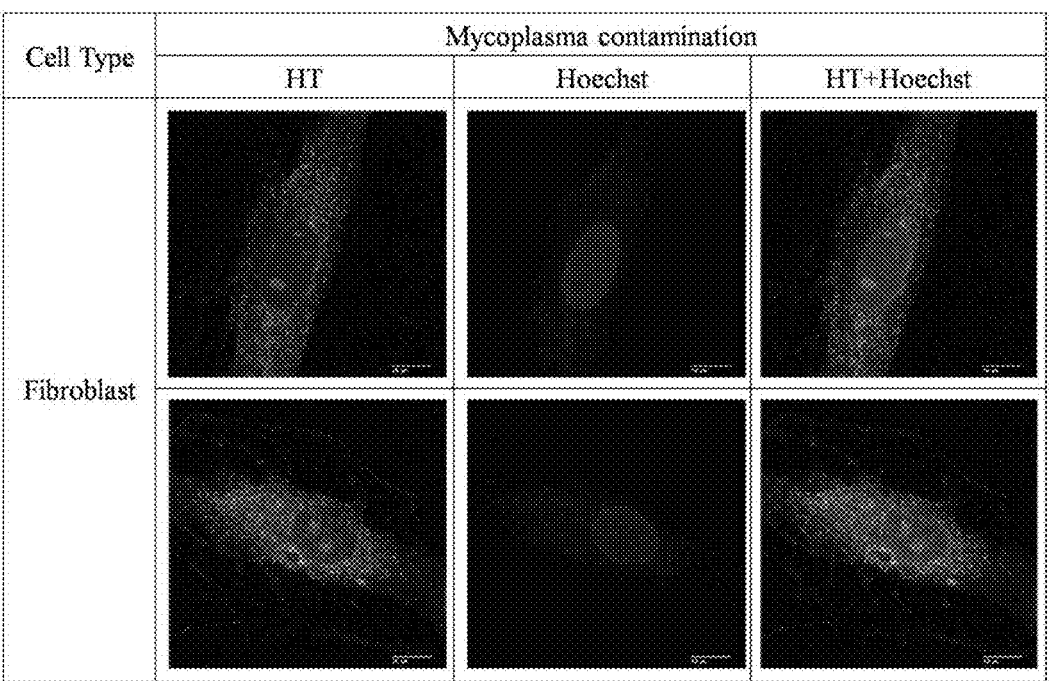

Furthermore, FIG. 9 illustrates a 3-D quantitative phase image (HT), a 3-D fluorescent image (Hoechst), and an overlap image (HT+Hoechst) of the 3-D quantitative phase image and the 3-D fluorescent image with respect to each of normal fibroblast and fibroblast that has been infected with *mycoplasma*.

As illustrated in the images of FIGS. 8 and 9, in a normal cell that has not been contaminated, only the nucleus of the cell is stained, and protoplasm is not stained. However, in a contaminated cell, DNA of *mycoplasma* is stained, and particles of a 3-D quantitative phase image having a high refractive index is monitored in the stained portion.

Figure 10:
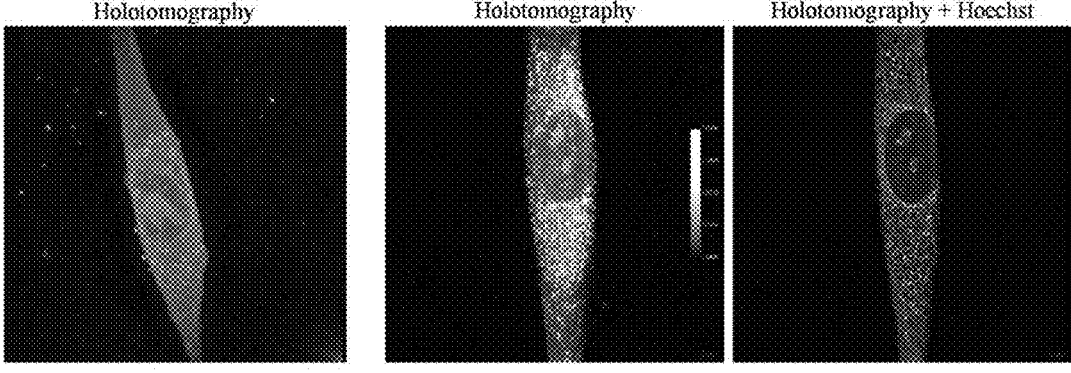

FIG. 10 illustrates a 3-D quantitative phase image (HT), and an overlap image (HT+Hoechst) of the 3-D quantitative phase image and a 3-D fluorescent image with respect to each of normal fibroblast and fibroblast that has been infected with *mycoplasma*.

Figure 11:
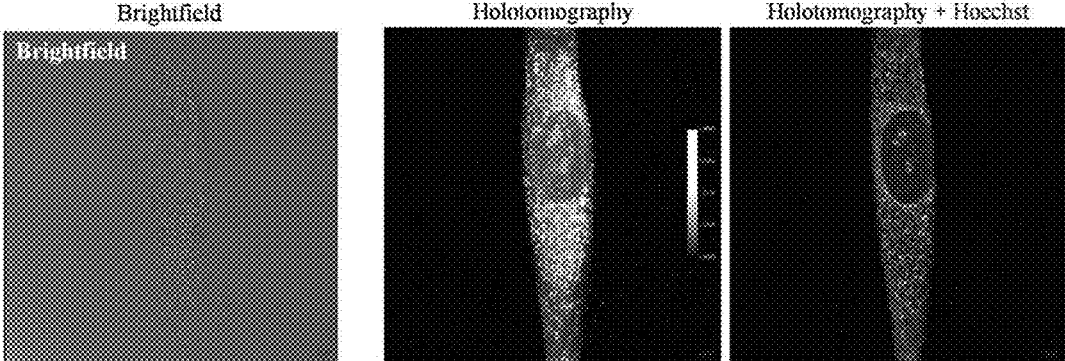

Furthermore, FIG. 11 illustrates a bright field image, a 3-D quantitative phase image (HT), and an overlap image (HT+Hoechst) of a 3-D quantitative phase image and a 3-D fluorescent image with respect to fibroblast that has been infected with *mycoplasma*.

As illustrated in the images of FIGS. 10 and 11, it is difficult to identify *mycoplasma* in the bright field image. However, the detection sensitivity of *mycoplasma* even in a specific condition, such as a bright field image, can be increased by determining whether a sample has been infected with *mycoplasma* by further using the results of the analysis of an overlapped image of a 3-D quantitative phase image and a 3-D fluorescent image. In other words, disadvantages of a direct stain method image and a 3-D quantitative phase image can be mutually supplemented by simultaneously using the direct stain method image and the 3-D quantitative phase image.

As described above, according to the embodiments of the present disclosure, there can be provided the methods and apparatuses for detecting *mycoplasma* using the measurement of a 3-D quantitative phase image.

The aforementioned system or device may be implemented as a hardware component or a combination of a hardware component and a software component. For example, the device and component described in the embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, virtual equipment, or a computer storage medium or device in order to be interpreted by the processing device or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means, and may be stored in a computer-readable medium. The computer-readable recording medium may include a program instruction, a data file, and a data structure solely or in combination. The medium may continue to store a program executable by a computer or may temporarily store the program for execution or download. Furthermore, the medium may be various recording means or storage means having a form in which one or a plurality of pieces of hardware has been combined. The medium is not limited to a medium that is directly connected to a computer system, but may be ones that are distributed and present in a network. Examples of the medium may be magnetic media such as a hard disk, a floppy disk, and a magnetic tape, optical media such as CD-ROM and a DVD, magneto-optical media such as a floptical disk, and ones configured to store a program command, including ROM, RAM, and flash memory. Furthermore, examples of another medium may include an app store in which apps are distributed, a site in which other various pieces of software are supplied or distributed, and recording media and/or storage media that are managed in a server. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A method of detecting *mycoplasma* by a computer device comprising at least one processor, the method comprising:
    generating, by the at least one processor, a three-dimensional (3-D) quantitative phase image of a sample by characterizing the sample by making quantitative a phase shift derived from light that passes through the sample;
    determining, by the at least one processor, whether the sample has been infected with *mycoplasma* by analyzing behavioral characteristics of the generated 3-D quantitative phase image; and
    generating, by the at least one processor, a 3-D fluorescent image of the sample based on a direct stain method,
    wherein determining whether the sample has been infected with *mycoplasma* comprises determining whether the sample has been infected with *mycoplasma* by further using results of an analysis of an overlapped image of the 3-D quantitative phase image and the 3-D fluorescent image.

2. The method of claim 1, wherein the behavioral characteristics comprise at least one of a refractive index, size, and sphericity of a cell included in the sample.

3. The method of claim 1, wherein determining whether the sample has been infected with *mycoplasma* comprises:
    calculating a distribution for a number of granules of a target cell line included in the sample in the generated 3-D quantitative phase image based on the behavioral characteristics;
    obtaining a distribution for a number of granules of an uninfected comparative cell line having a type identical with a type of the target cell line; and
    determining whether the target cell line has been infected with *mycoplasma* by comparing the distribution for the number of granules of the target cell line and the distribution for the number of granules of the comparative cell line.

4. The method of claim 3, further comprising constructing, by the at least one processor, a database for the number of granules of the comparative cell line,
    wherein obtaining the distribution for the number of granules of the comparative cell line comprises calculating a distribution for a number of obtained granules of the comparative cell line by obtaining the number of granules of the comparative cell line from the database.

5. The method of claim 3, wherein determining whether the target cell line has been infected with *mycoplasma* comprises determining that the target cell line has been infected with *mycoplasma* when an average or middle value of the number of granules of the target cell line and an average or middle value of the number of granules of the comparative cell line have a difference of a preset standard deviation or more.

6. A computer device comprising:
    at least one processor implemented to execute an instruction readable by the computer device,
    wherein the at least one processor
    generates a three-dimensional (3-D) quantitative phase image of a sample by characterizing the sample by making quantitative a phase shift derived from light that passes through the sample, and
    determines whether the sample has been infected with *mycoplasma* by analyzing behavioral characteristics of the generated 3-D quantitative phase image; and
    generates a 3-D fluorescent image of the sample based on a direct stain method,
    wherein determining whether the sample has been infected with *mycoplasma* comprises determining whether the sample has been infected with *mycoplasma* by further using results of an analysis of an overlapped image of the 3-D quantitative phase image and the 3-D fluorescent image.

7. The computer device of claim 6, wherein in order to determine whether the sample has been infected with *mycoplasma*, the at least one processor
    calculates a distribution for a number of granules of a target cell line included in the sample in the generated 3-D quantitative phase image based on the behavioral characteristics,
    obtain a distribution for a number of granules of an uninfected comparative cell line having a type identical with a type of the target cell line, and
    determines whether the target cell line has been infected with *mycoplasma* by comparing the distribution for the number of granules of the target cell line and the distribution for the number of granules of the comparative cell line.

* * * * *